US007935378B2

(12) United States Patent
Mattson et al.

(10) Patent No.: US 7,935,378 B2
(45) Date of Patent: May 3, 2011

(54) NECTARINE JUICE DRINK

(75) Inventors: Peter Mattson, Hillsborough, CA (US);
Patricia Goodman, Oakland, CA (US);
Maris Lunt, Campbell, CA (US)

(73) Assignee: Nectarine Administrative Committee, Reedley, CA (US)

( * ) Notice: Subject to any disclaimer, the term of this patent is extended or adjusted under 35 U.S.C. 154(b) by 893 days.

(21) Appl. No.: 10/986,517

(22) Filed: Nov. 10, 2004

(65) Prior Publication Data

US 2006/0099309 A1 May 11, 2006

(51) Int. Cl.
*A23L 2/02* (2006.01)

(52) U.S. Cl. ............ 426/615; 426/52; 426/51; 426/489; 426/508; 426/510; 426/518

(58) Field of Classification Search .................. 426/615, 426/52, 51, 489, 508, 510, 518
See application file for complete search history.

(56) References Cited

U.S. PATENT DOCUMENTS

| | | | | |
|---|---|---|---|---|
| 1,956,615 A | * | 5/1934 | Hansen | 426/482 |
| 2,466,014 A | * | 4/1949 | Erickson et al. | 127/44 |
| 3,083,104 A | * | 3/1963 | Celmer | 426/50 |
| 3,366,489 A | * | 1/1968 | Wagner et al. | 426/599 |
| 3,381,602 A | * | 5/1968 | Gluckstein et al. | 83/440 |
| 3,549,384 A | * | 12/1970 | Bosy et al. | 426/589 |
| 3,886,296 A | * | 5/1975 | Brooks et al. | 426/325 |
| 4,371,552 A | * | 2/1983 | Posorske | 426/50 |
| 6,368,654 B1 | * | 4/2002 | Evans et al. | 426/615 |
| 658,581 A1 | | 7/2003 | Marks et al. | |
| 7,229,658 B1 | * | 6/2007 | Inoue et al. | 426/548 |
| 2002/0192350 A1 | * | 12/2002 | Hynes et al. | 426/590 |

FOREIGN PATENT DOCUMENTS

| | | |
|---|---|---|
| CN | 1066571 | 12/1992 |
| ES | 2032701 | 2/1993 |
| FR | 2739259 | 4/1997 |
| JP | 01218576 A1 * | 8/1988 |
| WO | WO-9111920 | 8/1991 |

OTHER PUBLICATIONS

Baby Food Recipes located at http://casademoda.com/twins/babyfood.html, visited on Oct. 18, 2004. (6 pages).
Drying Fruits & Vegetables (1995). A Pacific Northwest Extension Publication PNW 397, 2nd Edition, pp. 9-10.
Health & Nutrition—Freezing Fruits located at http://www.cpma.ca/Nutrition/en/freezingf.html visited Oct. 18, 2004. (3 pages).
"How to Keep a Taste of Summer all Winter Long" located at http://www.freep.com/features/food/ghow22_20040622.htm visited on Oct. 18, 2004. (4 pages).

(Continued)

*Primary Examiner* — Helen F Heggestad
(74) *Attorney, Agent, or Firm* — Baker & Hostetler LLP

(57) ABSTRACT

A nectarine juice drink and methods of producing a nectarine juice drink are described. The method involves (a) providing nectarines; (b) treating the nectarines with heated, moist air or heated water to produce heat treated nectarines; (c) pressing the heat treated nectarines through one or more filters to produce a nectarine juice solution and (d) combining the nectarine juice solution with one or more plant cell wall degrading agents to produce a nectarine juice drink.

24 Claims, 1 Drawing Sheet

OTHER PUBLICATIONS

"Nectarine Nectar" located at http://www.1001recipes2send.com/Special_Diets/Gluten-Free/638-Nectarine_Nectar.shtml visited on Oct. 18, 2004. (2 pages).

"Home preparation of Juices, Wines and Cider" located at http://ourworld.compuserve.com/homepages/andrew_lea/ag-book.htm visited Oct. 18, 2004. (16 pages).

"Nectarine" located at http://www.encyclopedia.com/html/n1/nectarin.asp visited on Oct. 21, 2004. (4 pages).

"Nectarine (*Prunus persica* variety nectarina)" located at http://foodreference.com/html/artnectarine.html visited on Oct. 21, 2004. (2 pages).

"Frequently Asked Questions" located at http://www.splenda.com/page.jhtml?id=splenda/products/faq.inc visited Oct. 21, 2004. (3 pages).

Pectinex "Pectolytic Enzyme for the Fruit Juice Industry" Enzyme Business Novo Nordisk Ferment. 2 pages.

Nectarine Drink Advisory Group Meeting Sep. 15, 2004 (9 pages).

Minutes of the Joint Meeting of the Nectarine Administrative Committee, Peach Commodity Committee and the California Plum Marketing Board, Nov. 12, 2003 (16 pages).

Minutes of the Nectarine Administrative Committee, Nov. 12, 2003 (6 pages).

* cited by examiner

NECTARINE JUICE DRINK

FIELD OF THE INVENTION

This invention is in the field of food products. In particular, this invention relates to a nectarine juice drink and methods of producing a nectarine juice drink.

BACKGROUND OF THE INVENTION

Nectarines are a highly nutritious and popular food item. However, unlike other popular fruits such as oranges and apples which are readily available as juice, nectarine juice is comparatively much less readily available.

While fresh nectarines offer consumers one way of consuming this nutritious food item, they are not as convenient to store or consume as juice drinks.

There is thus a great need to provide a nectarine juice drink having a color, taste, and consistency pleasing to consumers.

SUMMARY OF THE INVENTION

In order to meet this need, the present application is directed to a nectarine juice drink having a color, taste, and consistency pleasing to consumers.

The present application is directed to a method of producing a nectarine juice drink by (a) providing nectarines; (b) treating the nectarines with heated, moist air or heated water to produce heat treated nectarines; (c) pressing the heat treated nectarines through one or more filters to produce a nectarine juice solution and (d) combining the nectarine juice solution with one or more plant cell wall degrading agents to produce a nectarine juice drink.

The nectarines provided to produce the nectarine juice drink may be whole nectarines, cut nectarines, chopped nectarines, sliced nectarines, fresh nectarines, frozen nectarines, canned nectarines, peeled nectarines, unpeeled nectarines or combinations thereof.

The nectarine juice drink of the application may contain one or more additional acids. The acids may be added prior to, during or after the pressing of the nectarines. Acids which find use in the nectarine juice include ascorbic acid, isoascorbic acid, malic acid, citric acid, fumaric acid, tartaric acid, propionic acid, acetic acid and lactic acid.

In the method of the present application the nectarines may be treated with heated, moist air or heated water. The heated, moist air or heated water may range in temperature from approximately 175° F. to approximately 225° F. The nectarines may be treated for a period of at least approximately 2 minutes.

In the method of the present application the nectarines may be treated with acidified heated, moist air or acidified heated water. The acidified, heated moist air or the acidified heated water may range in temperature from approximately 175° F. to approximately 225° F. The nectarines may be treated for a period of at least approximately 2 minutes. The acidified heated, moist air or acidified heated water may be acidified with one or more acids chosen from: ascorbic acid, isoascorbic acid, malic acid, citric acid, fumaric acid, tartaric acid, propionic acid, acetic acid and lactic acid.

In the method of the present application the nectarines are pressed through one or more filters to produce a nectarine juice solution. The filters may have a screen size ranging from approximately 0.01 inches to approximately 0.75 inches.

In the method of the present application the nectarine juice solution is treated with one or more plant cell wall degrading agents. The one or more plant cell wall degrading agents may be chosen from, but is not limited to: pectinase, pectin methylesterase, xylanase, arabanase, ferulic acid, amylase, cellulase, hemicellulase, pectintranseliminase, polygalacturonase and pectinesterase. The one or more plant cell wall degrading agents may be added at any point after, or while, the nectarines are treated with heated, moist air or heated water.

The present application is further directed to a method of producing a nectarine juice drink wherein the nectarine juice drink contains one or more sweeteners. The one or more sweeteners may be heat stable sweeteners. The one or more sweeteners may be chosen from, but is not limited to: sucralose, stevioside, acesulfame potassium and cyclamate. The amount of sweetener added can be determined by comparing the ratio of the tested brix to the tested acid of either the nectarine juice solution or the nectarine juice drink of the present application.

The present application is also directed to a method of producing a nectarine juice drink wherein the nectarine juice drink is decanted.

The present application is further directed to a method of producing a nectarine juice drink wherein the nectarine juice drink is heat pasteurized.

The present application is further directed to a method of producing a nectarine juice drink wherein the nectarine juice drink is hot filled into storage containers.

The present application is further directed to a nectarine juice drink produced by the methods of the present application.

The nectarine juice drink of the invention may be combined with other juices such as orange, apple, pear, peach, pomegranate, grape, grapefruit, or other juices.

The present application is also directed to food products produced using the nectarine juice drink produced by the methods of the present application. Such food products include, but are not limited to: frozen desserts, fruit cakes, fruit cookies, beverage blends, sauces, syrups, and confections.

DETAILED DESCRIPTION OF THE INVENTION

Figure 1:
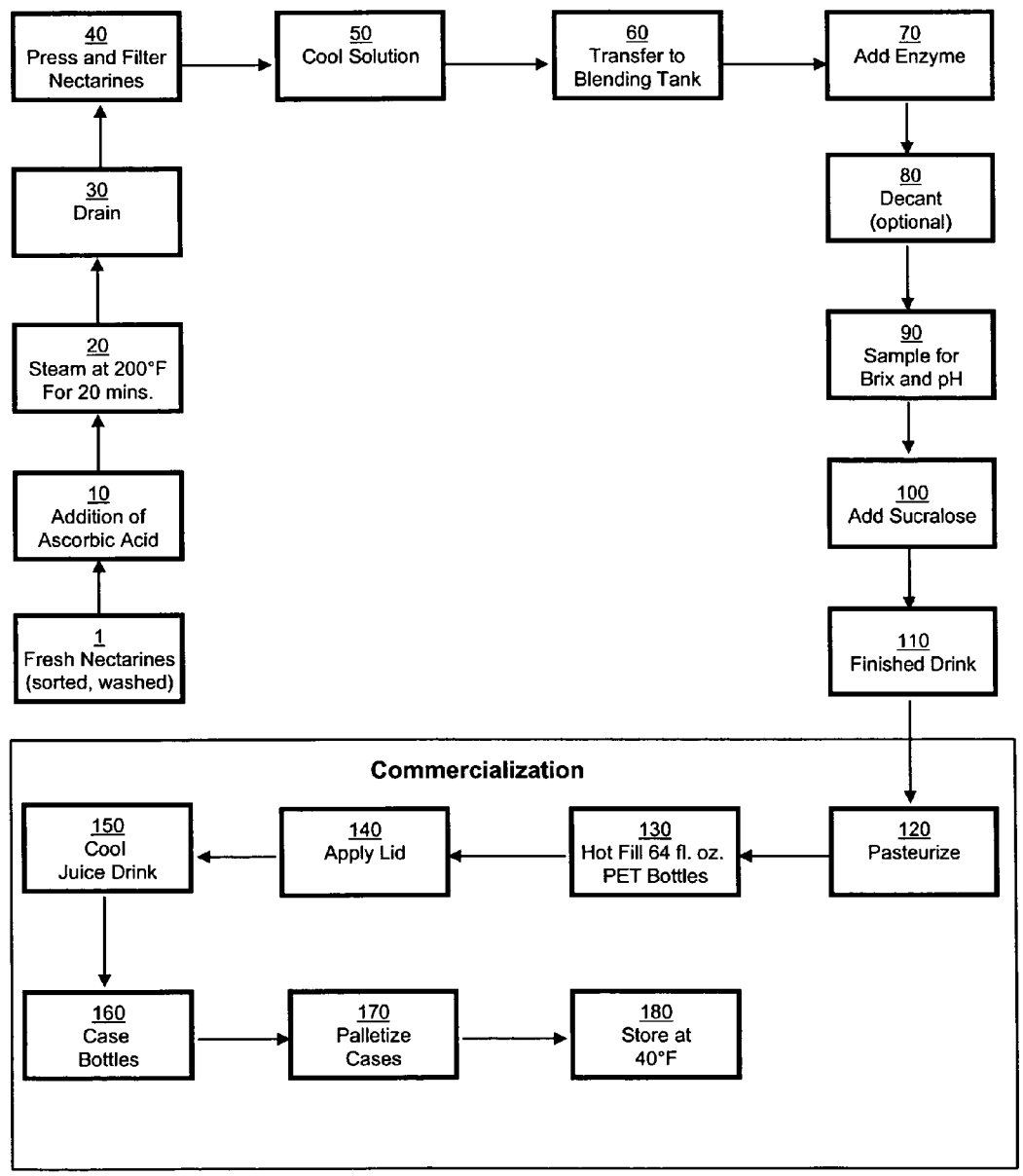
FIG. 1 is a block diagram illustrating the process steps of one embodiment of the invention.

The present application is directed to a nectarine juice drink and methods of producing a nectarine juice drink.

A nectarine juice drink as herein defined is a food beverage including the juice of nectarines. The nectarine juice drink of the present application may include additional water from a heated, moist air or heated water treatment, additional acids, plant cell wall degrading agents, and/or sweeteners.

Nectarines

The nectarine juice drink of the application is primarily produced from nectarines. Fresh, whole nectarines are preferred; however, frozen or canned nectarines can also be used. The nectarines may be substantially whole, cut, chopped, or sliced. The nectarines may be peeled or unpeeled.

Nectarines are the fruit of the deciduous *Prunus persica* var. *nucipersica* tree. Several subvariants exist such as Red Jim, Summer Blush, Fire Sweet, Rose Diamond and so forth; any or all of these variants are suitable for use in the current invention. The fruit of the nectarine tree is characterized by smooth skin, in contrast to peaches, whitish- to yellowish-pink flesh, and pronounced flavor. The present application is thus directed to a nectarine juice drink that maintains many of the distinctive characteristics of fresh nectarines including pleasing color, taste, and texture.

Unlike the fresh market, where fruit are consumed individually, nectarines for use in the nectarine juice drink of the present application need not be uniform in size, cosmetic features, or even ripeness, however nectarines which would be acceptable to the consumer for consumption also find use in making the nectarine juice drink of the present application. The nectarine juice drink of the current application allows nectarine producers to channel their smaller, slightly blemished, overripe, or underripe fruit to juice drink production rather than simply discarding them, using them as fertilizer, feeding them to livestock, or other low-yield uses. Thus, the nectarine juice drink of the present application will significantly increase the overall market for nectarines.

Color Control

It is desirable for a nectarine juice drink to exhibit a pleasing color, reminiscent of fresh, ripe nectarine fruit, as visual appeal is an important component of enjoying the juice drink. However, oxidation, perceived as a browning of the juice color, can be a problem in producing a nectarine juice drink. The addition of an acid, when necessary, can help control oxidation. Aside from oxidation, the visual appeal of the juice is diminished by reduction of nectarine pigmentation, resulting from the pigment being trapped in the flesh of the fruit during the juicing process. The methods of the present application solve these problems in producing nectarine juice drinks.

Acid Treatment

In one embodiment of the present application, one or more added acids is utilized in the production of the nectarine juice drink. Acids minimize the browning of the nectarine juice drink and contribute to the tartness, a key component of taste, of the nectarine juice drink.

Some such acids may be provided by the nectarines themselves. Generally, less ripe nectarines are more acidic than ripened nectarines. Addition of one or more acids is generally required. In some circumstances, however, less additional acid is required because the nectarines provided naturally contain enough acids to help minimize oxidation and provide sufficient tartness. In other circumstances, additional acids are required. In order to determine how much acid to add, a sample of the nectarines are macerated and pH of the macerated nectarines is determined. The pH can be determined through a number of means, including using a pH meter, pH paper, and manual titration methods, such as those described in OFFICIAL METHODS OF ANALYSIS OF AOAC INTERNATIONAL (William Horowitz ed., 17th ed. 2003). If the pH of the sample is less than 3.5 and addition of oxygen during processing is minimized, little additional acid is needed. If the pH of the sample is greater than 3.5 or if addition of oxygen during processing is not minimized, greater additional acid is required. Oxygen is minimized when the level of oxygen during the juice production process is maintained at a level lower than that of ambient atmosphere; oxygen is not minimized when steps are not taken to limit the amount of oxygen the process is exposed to. When the pH of the sample is greater than 3.5, sufficient acid should be added to titrate the sample to bring the pH of the sample to around 3.5; the ratio of acid, added to titrate, to nectarine sample is recorded. Acid is then added to the nectarines provided in proportion to the ratio determined during the prior testing.

The one or more acids may be added as either a solid or as a solution. The one or more acids may be chosen from, but is not limited to: ascorbic acid, isoascorbic acid, malic acid, citric acid, fumaric acid, tartaric acid, propionic acid, acetic acid and lactic acid. While not being bound by theory, certain acids, such as ascorbic acid, reduce browning by functioning as anti-oxidants; others, such as lactic acid, inhibit the enzymes within the fruit that cause browning. Any food-safe acid that can perform one, or both, of these functions may be used.

In one embodiment, the one or more acids is added directly to the nectarines, prior to any additional processing. In another embodiment, naturally acidic nectarines are combined with less acidic nectarines, to provide a portion or the required acids. In an additional embodiment, the one or more acids is added after a heated moisture treatment step. In yet another embodiment, the one or more acids is introduced, in combination with the heated, moist air or heated water treatment step, by exposing the nectarines to acidified heated, moist air or acidified heated water. In an additional embodiment, the one or more acids is added immediately after a pressing step. In one format, ascorbic acid, 0.30% to 0.04% by weight of total nectarines, is added prior to treating the nectarines with heated, moist air or heated water.

Heated Moisture Treatment

In the process of producing the nectarine juice drink of the present application, the nectarines are treated with heated, moist air or heated water for the purpose of preserving the natural, fresh colors of the fruit. Heated, moist air or steam is air containing water particles. Such heated moist air is produced by heating water to produce heated moist air or steam or by aerosolizing heated water. The heated, moist air or heated water treatment limits browning of the final nectarine juice drink by inactivating many of enzymes involved in oxidation. The heated, moist air or heated water treatment also extracts the natural pigmentation from the skin and flesh of the fruit, imparting a rich, vibrant color to the nectarine juice drink, similar to that of the fresh fruit. Furthermore, the exposure to heat and moisture also aids in pit removal, thereby increasing final juice yield. Finally, the heated, moist air or heated water helps to reduce the exposure of the nectarines to oxygen, as discussed above. The heated, moist air or heated water treatment should generally be applied prior to pressing; heated, moist air or heated water treatments applied a significant amount of time after pressing are less effective in preserving color, as oxidation increases.

In one embodiment, the heated, moist air or heated water treatment is provided by exposing the nectarines to heated, moist air or heated water, at a temperature ranging from approximately 175° F. to approximately 225° F., for at least approximately 2 minutes to approximately 40 minutes, or more. The nectarines are exposed to heated, moist air or heated water at a temperature and for a sufficient time to limit browning of the final nectarine juice drink, to extract the natural pigmentation from the skin and flesh of the fruit to impart a rich, vibrant color to the nectarine juice drink and to facilitate pit removal.

In yet another embodiment, the heated, moist air or heated treatment is performed by exposing the nectarines to acidified heated, moist air or acidified heated water, at a temperature ranging from approximately 175° F. to approximately 225° F., for at least approximately 2 minutes to approximately 40 minutes, or more. The heated, moist air or heated water is acidified by combining the one or more acids with water and heating the water. The one or more acids may be chosen from, but is not limited to: ascorbic acid, isoascorbic acid, malic acid, citric acid, fumaric acid, tartaric acid, propionic acid, acetic acid and lactic acid. In another embodiment, the heated, moist air or heated water treatment is conducted in a low oxygen environment, to further inhibit oxidation. Such reduced or low oxygen environments may be produced by introducing the steam into a treatment chamber, thereby displacing the ambient, oxygenated air. Treatment of the nectarines with heated, moist air or heated water results in heat treated nectarines. Heat treated nectarines generally retain some of the moisture from the heated, moist air or heated water.

Pressing and Juice Extraction

The heat treated nectarines are pressed after the heated, moist air or heated water treatment. Pressing involves macerating the nectarines and filtering the nectarines through one or more screens, also known as finishers, the filtering may be facilitated by applying pressure to the macerated nectarines. A finisher is a perforated screen of varying size used to filter the macerated nectarines, trapping certain solids, such as the pit or pit fragments, breaking down other solids, and yielding a nectarine juice solution. The number, and size, of the finishers used can be adjusted according to the level of filtration desired. In one embodiment, the filtering is performed using one or more filters, wherein each of the filters is a screen with openings ranging from 0.01 inches to 0.75 inches. Pressing the heat treated nectarines results in a nectarine juice solution.

Plant Cell Wall Degradation

It is desirable for a nectarine juice drink to have a refreshing quality, with a high percentage of soluble to insoluble solids, while still maintaining most of the flavors, colors, and nutritional value of fresh nectarines. The cells of nectarines have cell walls that would, if left untreated, make the nectarine juice drink overly viscous and non-refreshing. However, exclusion of this cell wall material, through aggressive filtering for example, generally reduces the flavors, colors, and nutritional value of the nectarine juice drink. Hence, it is important to reduce the viscosity of the nectarine juice drink while maintaining its refreshing quality, flavors, colors, and nutritional value.

In the method of the present application, the viscosity of the nectarine juice solution is reduced using one or more cell wall degrading agents. Such agents break down the components of cell walls, thereby decreasing the viscosity of the juice solution, increasing juice yields, releasing nutrients and solids contained in intact cells, and assisting in the release of the pigments extracted by the heated, moist air or heated water treatment. Such cell wall degrading agents include, but are not limited to: pectinase, pectin methylesterase, xylanase, arabanase, ferulic acid, amylase, cellulase, hemicellulase, pectintranseliminase, polygalacturonase and pectinesterase. The degradation agent may be added at any point after the heated, moist air or heated water treatment. Any food safe plant cell wall degrading agent may be utilized. Such plant cell wall degrading agents are available from suppliers such as Novozymes, or manufacturers such as Novo Nordisk. Alternately, such agents can be isolated or purified from natural or recombinant sources for use in the methods of the application.

The quantity of plant cell wall degrading agents used varies depending on the efficacy of the specific agent or agents selected, the specific activity of the agent or enzyme, and the concentration of those agents, in solution. One skilled in the art can readily ascertain the quantity required based on specifications provided by the plant cell wall degrading agent supplier and/or by testing the agent or agents on the nectarine juice solution. Sufficient plant cell wall degrading agents should be added to achieve the degree of cell wall degradation desired while avoiding undesired hazing of the nectarine juice drink, from excessive addition of the degrading agent. In one embodiment, the one or more plant cell wall degrading agents are combined with the nectarine juice solution then heated and maintained at approximately 90° F. to approximately 120° F. for a period of approximately 20 minutes to approximately 60 minutes, or more, to facilitate cell wall degradation. Alternatively, the plant cell wall degrading agents may be added to heated nectarine juice solution. The elevated temperatures increase the activity of the plant cell wall degrading agent or agents, thereby facilitating cell wall degradation. In one format, the plant cell wall degrading agent is Pectinex™, manufactured by Novo Nordisk, added in a ratio of approximately 2.5 ml to approximately 10 ml, per 1,000 lbs of nectarines provided.

In yet another embodiment, the nectarine juice is decanted after pressing and treating with one or more plant cell wall degrading agents. Decanting involves storing the nectarine juice in a first container and allowing sufficient time for solids to settle near the bottom. The juice is then gradually transferred to a second container, while leaving a substantial portion of the solids in the first container. Decanting is a means by which viscosity of the juice drink is regulated.

Sweetener Addition

It is also desirable to maintain consistent flavoring in a nectarine juice drink. Consumers understand and accept that the flavors of fresh fruit vary from fruit to fruit; feeling, smelling, and otherwise inspecting fruit is an important part of the purchase process. However, consumers expect that a commercial nectarine juice product, uniformly packaged without perceivable variation, should exhibit a consistent taste in every bottle.

In one embodiment of the present application, one or more sweeteners is added to the nectarine juice drink, in order to provide a nectarine juice drink with consistent taste. Addition of one or more sweeteners is only required if the nectarines provided are not sufficiently sweet; in some circumstances no additional sweetener is required because the nectarines provided naturally contain enough sugars to provide sufficient sweetness. The one or more sweeteners may be added as either a solid or as a solution. The one or more sweeteners may be added either before or after the plant cell wall degrading agent treatment.

The one or more sweeteners may be a heat-stable sweetener; a heat stable sweetener is a sweetener which does not undergo chemical change in the temperature range practiced in the method of the present application. In yet another embodiment, the sweetener is calorie-free, as consumers often do not prefer additional caloric content in fruit juice drinks. By calorie-free it is meant that the sweetener does not contribute additional, metabolizable calories to the nectarine juice drink. The one or more calorie-free sweeteners include, but is not limited to: sucralose, stevioside, acesulfame potassium and cyclamate; these calorie-free sweeteners are also heat-stable. Any food safe sweetener may be used.

The amount of one or more sweeteners added, depending on the sweetness desired, is determined by a ratio of the tested brix value to the tested acid value. Brix is a measure of sugar in solution performed with a refractometer. Acid is measured by determining the pH. The pH is a measure of the hydrogen potential of solution, performed through a variety of means readily determined by one skilled in the art. Such means include use of pH paper, pH meters, titration, etc. The ratio of brix to acid is a measure of sweetness to tartness. The amount of sweetener added can be varied depending on the flavor desired. In one format, the added sweetener is sucralose. In another format, the amount of sucralose added per weight of nectarine juice is based upon the brix/acid ratio as provide in Table 1, below.

TABLE 1

| Brix/Acid Ratio | Sucralose to Add, by % of Juice Weight |
|---|---|
| 16 to 20 | .0220% |
| 21 to 24 | .0210% |
| 25 to 28 | .0200% |
| >28 | .0180% |

In some circumstances, it is desirable to add additional acid or acids in addition to the sweetener addition. Such acids can be added in an amount sufficient to provide a desired tartness. The one or more acids may be chosen from, but is not limited to: ascorbic acid, isoascorbic acid, malic acid, citric acid, fumaric acid, tartaric acid, propionic acid, acetic acid and lactic acid. In one format, the acid is citric acid. In another format, the acid is malic acid.

Commercial Packaging

The nectarine juice drink of the current application is highly adaptable to commercial production methods known in the art.

In one embodiment, the nectarine juice drink is heat pasteurized for sanitary purposes. Heat pasteurization involves heating the nectarine juice drink to a minimum temperature for a minimum amount of time, sufficient to kill harmful bacteria.

In another embodiment, the nectarine juice drink is hot filled into storage containers. Hot filling is a method known in the art for the purpose of minimizing bacterial contamination. Hot filling involves heating the nectarine juice drink to approximately 150° F. to approximately 200° F., and maintaining the temperature until the nectarine juice drink is packaged and sealed.

An example of the nectarine juice drink of the present application is a commercially packaged, nectarine juice drink including: 98% nectarine juice, with additional water, additional acid, cell wall degrading agents, and sweeteners comprising the remaining 2%.

The nectarine juice drink of the present application may be combined with other juices. Such juices include, but are not limited to: orange, apple, pear, peach, pomegranate, grape, grapefruit and so forth.

The nectarine juice drink of the present application may also be utilized in the production of food products. Examples of food products produced using the nectarine juice drink of the present application include, but are not limited to: frozen desserts, fruit cakes, fruit cookies, beverage blends, sauces, syrups and confections.

The application will be better understood by reference to the following non-limiting example.

EXAMPLE

With reference to FIG. 1, the following is a description of one embodiment of the present application. The production of the nectarine juice drink, in the present example, was conducted by representatives of, and on equipment provided by, the Stapleton-Spence Packaging Company of San Jose, Calif., at their Gridley, Calif. facility. In step 1, fresh nectarines, harvested from the orchards where they are grown, were selected, sorted into bins, and then cleaned prior to processing. Ascorbic acid, 0.04 lbs for every 100 lbs of nectarines, was added to each of the nectarine bins during step 10.

At this stage, the nectarines are ready for the heated, moist air treatment. In step 20, the bins of nectarines are individually fed into Stapleton-Spence's screw steamer, set to generate steam at 25% of its maximum steam generating capacity. The screw steamer creates a low oxygen environment into which steam, at 200° F., is introduced. The screw steamer gradually moves the nectarines through the steaming chamber by means of a mechanical screw. The total exposure time is approximately 20 minutes.

The nectarines are then drained, step 30, in preparation for maceration and pressing, step 40. Three Stapleton-Spence pressers are then used to press and filter the nectarines. The pressers utilize screens with successively smaller openings to remove the pit or pit fragments, break down certain solids, and filter out other solids. The resulting nectarine juice solution is then cooled, in step 50, to 90° F. to 120° F.

In step 60, the solution is transferred to a jacketed blending tank. Step 70 includes treating the filtered nectarine juice with Pectinex™, a plant cell wall degrading agent mixture of cellulase, hemicellulase, pectintranseliminase, polygalacturonase and pectinesterase available from Novo Nordisk, for a period of approximately 25 minutes. Twenty-five (25) ml of Pectinex™ is added for each 10,000 lbs of whole nectarines used. The plant cell wall degrading agent mixture facilitates break down of the nectarine cell walls, thereby increasing juice yields and improving the consistency of the final nectarine juice drink.

The Pectinex™ treated juice may be further clarified through decanting, step 80. Decanting removes a portion of the insoluble solids that contribute to the consistency, or body, of a fruit juice drink. Decanting can be varied or even omitted, depending on the desired consistency.

At step 90, the juice is sampled and tested for brix, a measurement of the sugar content, and for pH, a measure of the acid content of the solution. Brix is tested using a refractometer and pH is tested using a pH meter and burette titration. A calculation of the ratio of brix to acid is made, and sucralose is added, in step 100, to adjust the juice drink to the desired sweetness to tartness characteristic. The amount of sucralose to be added, is determined by Table 1, above.

The fully constituted nectarine juice drink, 110, is then heat pasteurized in step 120 and hot filled into commercial packaging at step 130; a lid is applied at step 140. In step 150, the packaged juice drink beverage is cooled, by means of a cooling tunnel, to a desired temperature of approximately 40° F. to 100° F. The bottles are cased, step 160, and palletized, step 170. In step 180, the pallets of juice drink are stored at approximately 40° F., ready for delivery to retail outlets and consumers.

The nectarine juice drink made using the process depicted in FIG. 1 includes: fresh nectarine juice, water, ascorbic acid, plant cell wall degrading agents, and sucralose.

What is claimed as new and desired to be protected by Letters Patent of the United States is:

1. A method of producing a nectarine juice drink, consisting essentially of:
   (a) providing nectarines;
   (b) treating said nectarines with heated, moist air for approximately two minutes using a screw steamer to preserve the natural color of the nectarines;
   (c) pressing said heat treated nectarines through a plurality of filters to produce a nectarine juice solution; and
   (d) combining said nectarine juice solution with a mixture of plant cell wall degrading agents to produce a nectarine juice drink.

2. The method of claim 1 wherein said nectarines are selected from the group consisting of whole nectarines, cut nectarines, chopped nectarines, sliced nectarines, fresh nectarines, frozen nectarines, canned nectarines, peeled nectarines, unpeeled nectarines and combinations thereof.

3. The method of claim 1 wherein said nectarines are fresh, whole nectarines.

4. The method of claim 1 wherein said nectarine juice drink also comprises one or more acids added prior to, during or after step (c).

5. The method of claim 4 wherein said one or more acids is selected from the group consisting of ascorbic acid, isoascorbic acid, malic acid, citric acid, fumaric acid, tartaric acid, propionic acid, acetic acid and lactic acid.

6. The method of claim 4 wherein said one or more acids is ascorbic acid.

7. The method of claim 1 wherein said heated, moist air is at a temperature ranging from approximately 175° F. to approximately 225° F.

8. The method of claim 1 wherein said nectarines are treated with heated, moist air at a temperature of 200° F. for 20 minutes.

9. The method of claim 1 wherein said heated, moist air or said heated water is acidified heated, moist air or acidified heated water.

10. The method of claim 9 wherein said acidified heated, moist air or said acidified heated water is acidified with one or more acids selected from the group consisting of ascorbic acid, isoascorbic acid, malic acid, citric acid, fumaric acid, tartaric acid, propionic acid, acetic acid and lactic acid.

11. The method of claim 9 wherein said acidified heated, moist air or said acidified heated water is at a temperature ranging from approximately 175° F. to approximately 225° F.

12. The method of claim 1 wherein each of said one or more filters has a screen opening size ranging from approximately 0.01 inches to approximately 0.75 inches.

13. The method of claim 1 wherein said mixture of plant cell wall degrading agents is added after step (b).

14. The method of claim 1 wherein said mixture of plant cell wall degrading agents includes cellulase, hemicellulase, pectintranseliminase, polygalacturonase and pectinesterase.

15. The method of claim 1 wherein said nectarine juice drink also comprises one or more sweeteners.

16. The method of claim 15 wherein the amount of said one or more sweeteners added is determined by measuring the brix/acid ratio of said nectarine juice solution in step (c).

17. The method of claim 15 wherein the amount of said one or more sweeteners added is determined by measuring the brix/acid ratio of said nectarine juice drink in step (d).

18. The method of claim 15 wherein said one or more sweeteners is added to the nectarine juice drink after step (d).

19. The method of claim 15 wherein said one or more sweeteners is a calorie-free sweetener.

20. The method of claim 19 wherein said calorie-free sweetener is selected from a the group consisting of sucralose, stevioside, acesulfame potassium and cyclamate.

21. The method of claim 19 wherein said calorie-free sweetener is sucralose.

22. The method of claim 1 wherein said nectarine juice drink is decanted.

23. The method of claim 1 wherein said nectarine juice drink is heat pasteurized.

24. The method of claim 1 wherein said nectarine juice drink is hot filled into containers.

\* \* \* \* \*